（12） United States Patent
Akiyama et al.

(10) Patent No.: US 7,105,946 B2
(45) Date of Patent: Sep. 12, 2006

(54) DISTRIBUTED POWER GENERATION SYSTEM, AND POWER SUPPLY SYSTEM AND POWER SUPPLY METHOD UTILIZING THE SAME

(75) Inventors: Yukinori Akiyama, Ashikaga (JP); Masatoshi Ueda, Ooizumi-machi (JP); Nobuyoshi Nishizawa, Ashikaga (JP); Kazuhiro Tajima, Ashikaga (JP); Masataka Kadowaki, Ota (JP); Osamu Tajima, Ooizumi-machi (JP); Takeshi Kanai, Ooizumi-machi (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 405 days.

(21) Appl. No.: 10/109,485

(22) Filed: Mar. 25, 2002

(65) Prior Publication Data

US 2002/0143438 A1    Oct. 3, 2002

(30) Foreign Application Priority Data

Mar. 27, 2001  (JP)  ............................. 2001-091344

(51) Int. Cl.
*H03K 3/86*    (2006.01)
*H03J 1/00*    (2006.01)
(52) U.S. Cl. .............................. 307/16; 307/19; 307/38
(58) Field of Classification Search .................. 307/11, 307/16, 18, 19, 31, 38, 32, 39
See application file for complete search history.

(56) References Cited

U.S. PATENT DOCUMENTS 6,055,163 A * 4/2000 Wagner et al. ................. 363/37
6,166,525 A * 12/2000 Crook .......................... 322/11
6,420,801 B1 * 7/2002 Seefeldt ....................... 307/64
6,668,629 B1 * 12/2003 Leslie .......................... 73/116
6,850,820 B1 * 2/2005 Tajima ....................... 700/286

FOREIGN PATENT DOCUMENTS

| JP | H3-270651 A | 12/1991 |
|---|---|---|
| JP | 10-42472 A | 2/1998 |
| JP | H10-341530 A | 12/1998 |

* cited by examiner

*Primary Examiner*—Bao Q. Vu
(74) *Attorney, Agent, or Firm*—Christensen O'Conner Johnson Kindness PLLC (57) ABSTRACT

A plurality of distributed power generation systems are connected via the Internet to a managing apparatus in a managing company. A power company communicates with the managing apparatus via another line. At peak times of power consumption in the midsummer and so forth, the power company requests the managing company to supply the power. The managing company controls to remotely set generation capacity of the distributed generation systems at maximum so as to reverse surplus power therefrom to a power system. A normal power rate is discounted for a user of the distributed generation system for his/her cooperation with the power company. The managing company charges the power company based on the surplus electric energy supplied to the power company.

9 Claims, 9 Drawing Sheets

| USER | REVERSED ELECTRIC ENERGY |
|---|---|
| 003 | 151kWh |
| 052 | 1860kWh |

| PURCHASED POWER | ORDINARY RATE | a |
| --- | --- | --- |
| | SUBSCRIBER'S RATE | b |
| SUBSCRIBER'S POWER SELLING RATE | | c |
| SUBSCRIBER'S POWER GENERATION COST | | d |
| PROFIT FROM SUBSCRIBER'S POWER SALE | | p=c-d-b |

| CHARGE TO POWER COMPANY | TOTAL REVERSED ELECTRIC ENERGY T × UNIT PRICE e |
| --- | --- |
| CHARGE TO USER 003 | $p_{003}$ × 151 × COMPENSATION RATE r |
| CHARGE TO USER 052 | $p_{052}$ × 1860 × COMPENSATION RATE r |

| FORCED GENERATION TIMING | GENERATION CAPACITY |
|---|---|
| 8/10–12 11:00–17:00 | MAXIMUM |
| 8/17–19 11:00–17:00 | |

DISTRIBUTED POWER GENERATION SYSTEM, AND POWER SUPPLY SYSTEM AND POWER SUPPLY METHOD UTILIZING THE SAME

BACKGROUND OF THE INVENTION

1. Field of the Invention

The present invention relates to a power supply technology, and it particularly relates to a distributed power generation system and a power supply system and power supply method utilizing the distributed power generation system.

2. Description of the Related Art

Today new technologies, such as IT (Information Technology) and biotechnology, are making their appearance one after another on the global scene. Despite such a trend, the energy industry remains one of the largest basic industries. Recently, along with the growing awareness of the global warming and other environmental problems, the human society is placing great hopes on the so-called new energies. In addition to their environmental aspects, the new energies present such advantages as low transmission loss and security of power supply because their energy production can be distributed close to the power consumers Moreover, it can be expected that developing the new energies have a secondary effect of creating new peripheral industries.

Serious efforts to develop new energies began on the heels of the oil crisis of about 30 years ago. Today, the new energies, whose development is entering the stage for practical applications, include, for instance, the renewable energy from solar power generation, the recycling energy from wastes power generation, the high-efficiency energy from fuel cells, and the energies in new areas such as for clean energy cars.

Of these, the fuel cell energy is one of the energies attracting particular attention of the industry. The fuel cell produces electricity arid heat at the same time, using a chemical reaction of atmospheric oxygen to hydrogen made by mixing water vapor into natural gas or methanol. This mode of power generation produces only water as the byproduct and is highly efficient in the low-output range and stable without being affected by the weather. The solid polymer fuel cells, whether for home or other stationary use or vehicular use, are considered to be one of the standard energy sources in the next generation.

The power generation systems using solid polymer fuel cells are today on the way for practical applications after trial manufacture. The wider use of the fuel cells depends on how the cost can be reduced. While the initial cost is the problem to be solved by the developers, the operation cost and the merit of their use depend also on the relationship of the systems using the fuel cells with the commercial power supply systems.

Thus, to realize the wide use of fuel cells, it is not only necessary to technically improve the fuel cells themselves, but also to create a business model structuring the environment in which the fuel cells are used. And this business model need be such as to provide merits to the system users, the power company and other parties involved in the system.

SUMMARY OF THE INVENTION

The present invention has been made in view of the foregoing circumstances and an object thereof is to provide a technology that promotes the introduction and use of distributed power generation systems using fuel cells or like energy sources.

A preferred embodiment according to the present invention relates to a distributed-type power generation system (simply referred to as a distributed power generation system hereinafter). This system has a generator therein and includes: a communication unit which communicates with a network; and a control unit which controls generation capacity of the generator in accordance with an instruction issued via the network. The "generator" may be an arbitrary power generator, and a fuel cell in which stability can be expected in its generation capacity serves as one of suitable and preferred examples.

The generation capacity of the distributed power generation system is, in general, controlled independently at a place, such as residence or building, where the system is installed. This control is manually or automatically performed at the discretion of a consumer, that is, a user of this system (also simply referred to as a user hereinafter), or in accordance with situation of power demands at a place where the system is installed. However, according to this embodiment, the control is executed in accordance with an instruction issued via the network, irrespective of a user's direct intention. Thus, for example, the generation capacity of the generator is increased from a remote location, so that surplus power can be reversed to the power system.

Another preferred embodiment according to the present invention relates also to a distributed power generation system. This system has also a generator therein, and includes: an instruction table which describes an instruction as to generation capacity of the generator in a time-dependent manner; and a control unit which controls the generation capacity in accordance with description of the instruction table. For example, time and date when the power demand will be at its peak in the power system is described in the instruction table, and the generation capacity is increased at the time and date described, so that surplus power can be reversed to the power system.

Still another preferred embodiment according to the present invention relates also to a distributed power generation system. This system includes a control unit which controls generation capacity of the generator. This control unit includes: a first setting unit which receives from a user of the distributed power generation system a setting of the generation capacity; and a second setting unit which receives a setting of the generation capacity via a network, wherein processing of a setting content in the second setting unit is given higher priority compared to that of a setting content in the first setting unit. By implementing this structure, the generation capacity is enhanced, as needed, from a remote location, and the surplus power can be generated. The control unit may control opening and closing of a path to reverse-feed power generated by the generator to a power system.

Still another preferred embodiment according to the present invention relates to a power supply system. This system includes a managing apparatus. This managing apparatus is connected, via a network, to distributed power generation systems each of which has a generator, and remotely controls generation capacity of the generator. When power to be supplied from a power supply party to a power system becomes short, this managing apparatus may increase the generation capacity and cause the distributed power generation systems to generate surplus power which is to be reversed to the power system. "Party" is a body, entity or apparatus working for its purpose.

Still another preferred embodiment according to the present invention relates also to a power supply system. This system includes: a distributed power generation system which includes a generator; a managing party, connected to the distributed power generation system via a network, which remotely controls generation capacity of the generator; and a power supply party which supplies electric power to a power system and communicates with the managing party. When a power demand exceeds a power supply capacity, the power supply party notifies accordingly to the managing party. When notified accordingly from the power supply party, the managing party sends, via the network, said distributed power generation system an instruction instructing to increase the generation capacity, and the distributed power generation system increases the generation capacity in accordance with the instruction, so that a surplus power produced as a result thereof is supplied to the power system by reversing the surplus power thereto.

In this system, a series of processings may be performed based on a first contract concluded between the power supply party and the managing party to the effect that a rate of power supplied from the power system to a user of the distributed power generation system that supplied the surplus power is set to a discounted rate in exchange for the surplus power supplied thereby, and a second contract concluded between the managing party and the user to the effect that the user allows the managing party to remotely control the generation capacity in exchange for a merit realized by the discounted rate. In that case, the power supply system may include a storage which stores an amount of power supplied by the reversing from the distributed power generation system to the power system so that effectiveness of the first and second contracts is secured.

The managing party may include a surplus power confirming unit which confirms, as appropriate, surplus power that can be supplied from the distributed power generation system. The confirmation may be made in a form of reply from users or in a form such that supply of surplus power is requested through appealing to users in public. Or, the confirmation may be made based on objective data calculated from operation records or the like of each distributed power generation system. The surplus power thus confirmed can be utilized for estimating an amount of power that can be reversed in the future and can be also useful when a decision is to be made as to which distributed power generation system is used for the power reversing and so forth.

Still another preferred embodiment according to the present invention relates to a power supply method. This method includes: increasing, by a remote operation, generation capacity of a distributed power generation system which has a generator whose generation capacity is controlled independently at a site where the generator is normally installed, in the event of a power supply shortage in the power system; and reversing to the power system a surplus power generated as a result of the increasing. The "site where the generator is normally installed" means the residence of a user of the generator or a business place, which is so-called a local place.

It is to be noted that any arbitrary replacement or substitution of the above-described structural components and the steps, expressions replaced or substituted in part or whole between a method and an apparatus as well as addition thereof, and expressions changed to a computer program, recording medium or the like are all effective as and encompassed by the present embodiments.

Moreover, this summary of the invention does not necessarily describe all necessary features so that the invention may also be sub-combination of these described features.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
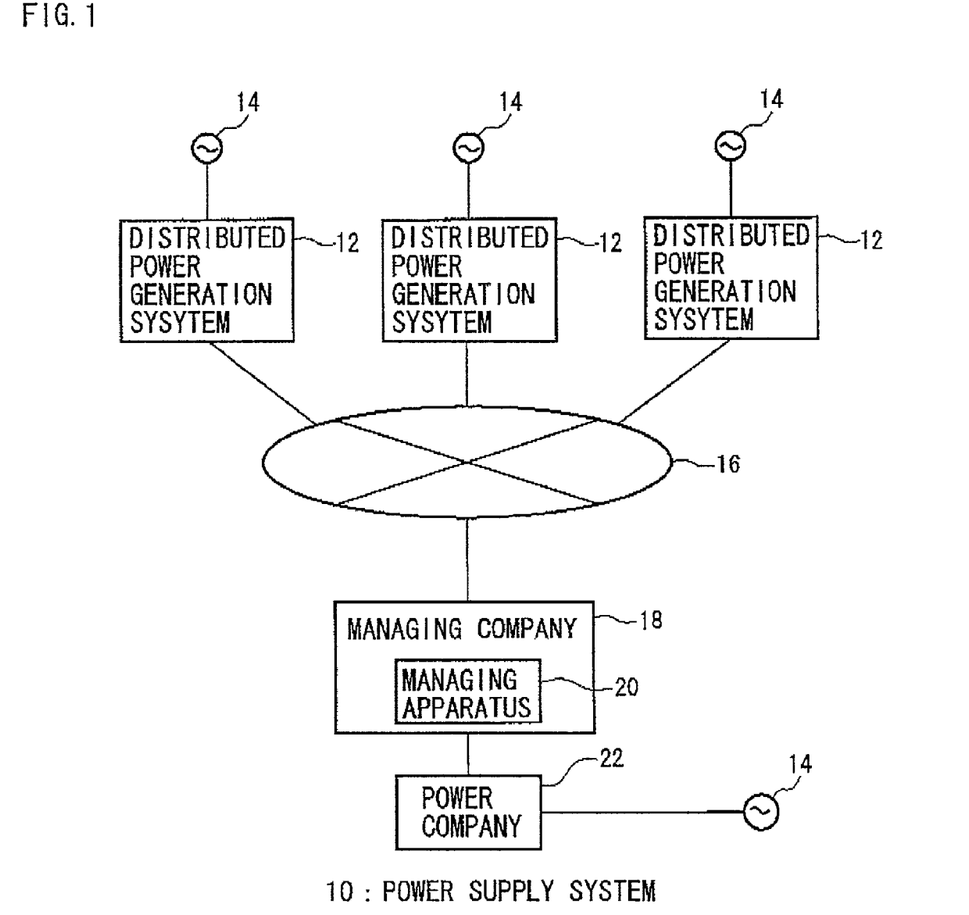
FIG. 1 shows a general structure of a power supply system according to a preferred embodiment of the present invention.

FIG. 1 shows a general structure of a power supply system 10 according to a preferred embodiment of the present invention. FIG. 1 shows an ordinary electronic network, not a network for power transmission.

In the power supply system 10, a plurality of distributed power generation systems 12 are connected via the Internet 16 to a managing company 18 which includes a managing apparatus 20 that manages and controls the distributed power generation systems 12. The managing company 18, which is connected to a power company 22 by a dedicated liner carries out business commissioned by the power company 22. The power company 22 supplies electric power over a commercial power system 14 to houses or buildings of consumers who have the distributed power generation systems 12. Each of the distributed power generation systems 12 is equipped with a fuel cell system which is expected to provide stable and highly efficient power generation.

A basic business model for the power supply system 10 is so arranged that at midsummer or other peak times of power consumption the managing apparatus 20 sets remotely generation capacity of the distributed power generation systems 12 to maximum and thus reverses the resulting surplus power to the power system 14. This arrangement allows the power company 22 to use the power generation systems in the private sector to get over the peak times of power demand and avoid problems concerning costs for securing sites to add power plant facilities and so forth. On the other hand, the consumers who are also the users of the distributed power generation systems 12 receive discounts on their electricity rates from the power company 22. The managing company 18 handles these procedures in place of the power company 22 and charges the users or the power company 22 the handling fees. While some legislative arrangement may be necessary for the reversing of electric power to the power system 14, there should exist much latent demands for this business model which will benefit both the users and the suppliers of electric power. The fuel cell system is characterized by its high-efficiency operation even at low-load times. Accordingly, it is also advantageous in that greater amounts of surplus power can be obtained by supplying in advance the power of greater ratings to the users.

In order to realize this model, the managing company 18 and the power company 22 first enter into a contract with the users of the distributed power generation systems 12 which specifies the discounts to be given on their electricity rates in exchange for the surplus power supplied by them. Between the managing company 18 and the users of the distributed power generation systems 12, on the other hand, another contract is made by which the users of the distributed power generation systems 12 allows the managing company 18 to remote-control the generation capacity of their systems in exchange for the discounts to be given on their electricity rates.

Figure 2:
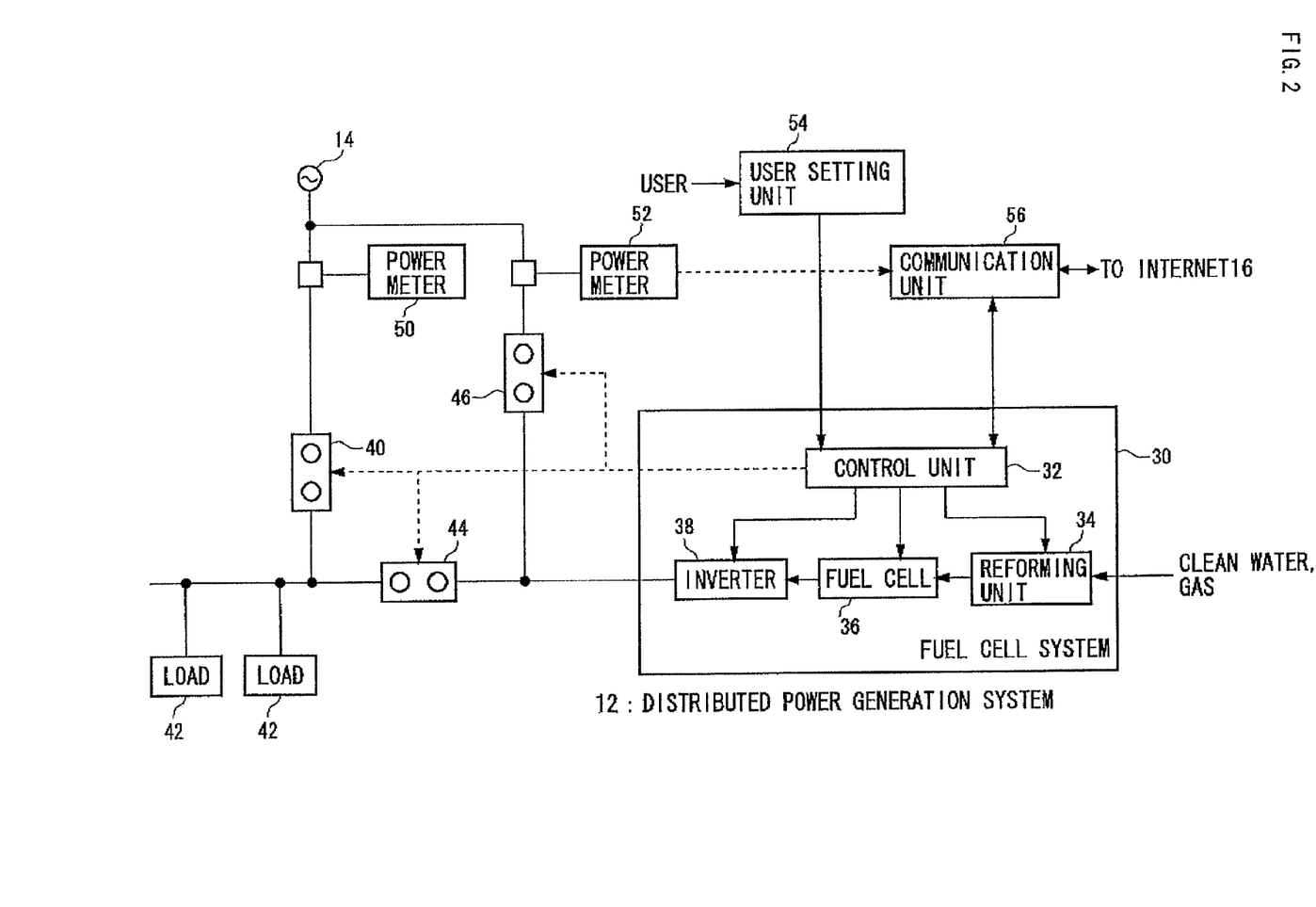
FIG. 2 shows a structure of a distributed power generation system according to a preferred embodiment of the present invention.

FIG. 2 shows a structure of the distributed power generation system 12. A fuel cell system 30 comprises: a reforming unit 34 which produces hydrogen by having water vapor made from clean water react to natural gas, methanol or the like; a fuel cell 36 which produces water and direct-current voltage from a reaction of the hydrogen on oxygen; an inverter 38 which converts the DC voltage into alternating current; and a control unit 32 which controls the whole procedure. A user setting unit 54 receives a user's instruction on a power generation capacity and conveys it to the control unit 32. The instruction is given on the order of kilowatts, or in such a mode as "maximum output," "intermediate output" or "output stop," and the control unit 32 controls respective portions of the fuel cell system 30 according to the instruction. A decision as to whether to use the power from the fuel cell system 30, to purchase it from the power system 14, or to use these powers in combination is generally made by the user. According to this embodiment of the present invention, however, there is another possibility of remote-controlled reversing of power, which will be described hereinbelow.

On the other hand, a communication unit 56 receives instructions from the managing apparatus 20 and conveys them to the control unit 32. These instructions (referred to as "remote instructions" hereinafter), which specify a "maximum" generation capacity for the fuel cell system 30, are issued, for instance, in the daytime of midsummer, when the power supply by the power company 22 becomes very tight and restricted. The control unit 32 controls respective portions according to a remote instruction and reverses the surplus power to the power system 14. It is to be noted, however, that the control unit 32 is not necessarily required to control all of the reforming unit 34, the fuel cell 36 and the inverter 38, but it suffices that the generation capacity can be properly adjusted.

A first switch 40, which is provided in a path between the power system 14 and a load 42, is closed when power is purchased from the power system 14. A second switch 44, which is provided in a path between the fuel cell system 30 and load 42, is closed when power is supplied from the fuel cell system 30 to the load 42. A third switch 46, which is provided in a path between the fuel cell system 30 and the power system 14, is closed when power is to be reversed. In the structure of FIG. 2, the opening and closing of the first switch 40 are generally opposite to those of the second switch 44, and the third switch 46 is "closed" only when the first switch 40 is "open". These three switches are controlled by the control unit 32.

A first power meter 50 meters the electric energy purchased, and a second power meter 52 meters the electric energy reversed. The latter reading is sent to the managing apparatus 20 via the communication unit 56, and the total reversed electric energy is recorded at the managing apparatus 20 as will be described later.

Figure 3:
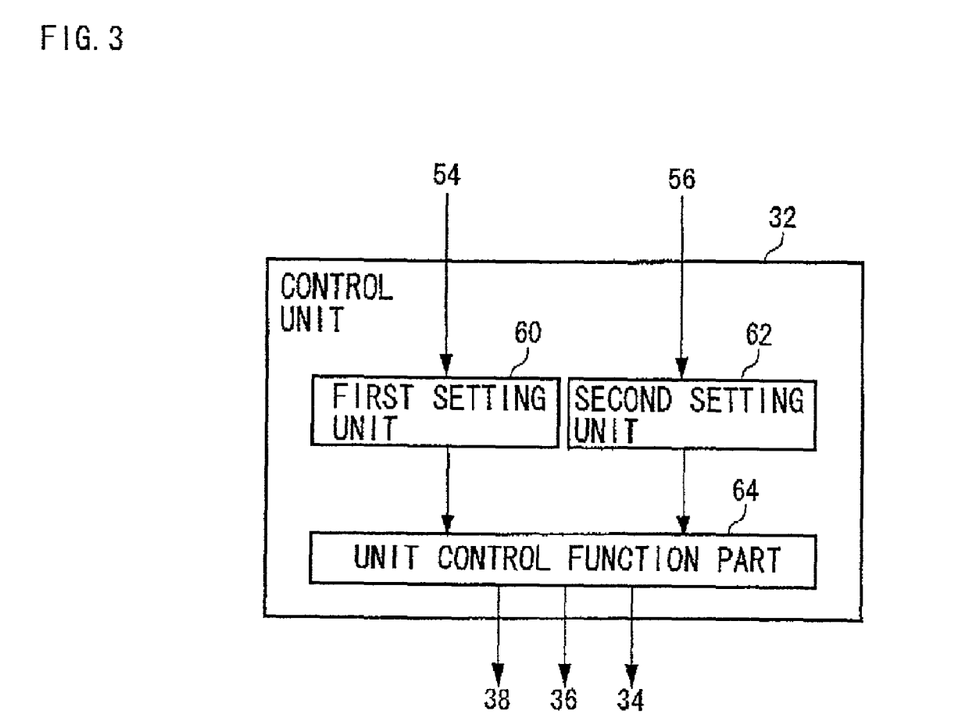
FIG. 3 shows a structure of a control unit in the distributed power generation system.

FIG. 3 shows a structure of the control unit 32. The function of the control unit 32 is realized by hardware, such as a microcomputer, memory and other LSIs, or by software, such as a power generation controlling program and so forth. In FIG. 3, however, the functions only, which are realized by the combination of hardware and software, are shown in blocks. Thus, it should be understood by those skilled in the art that these functional blocks can be realized by various combinations of hardware and software.

A first setting unit 60 sets user's instructions acquired by a user setting unit 54, and this setting content is notified to a unit control function part 64. A second setting unit 62 sets remote instructions acquired via the communication unit 56, and this setting content is notified to the unit control function part 64. The first setting unit 60 and the second setting unit 62 may both be considered and regarded as system registers for generation capacity control. The unit control function part 64 normally controls the respective portions according to the settings of the first setting unit 60. However, when a remote instruction is set in the second setting unit 62, the unit control function part 64 controls the respective portions in preference to the settings of the first setting unit 60.

Figure 4:
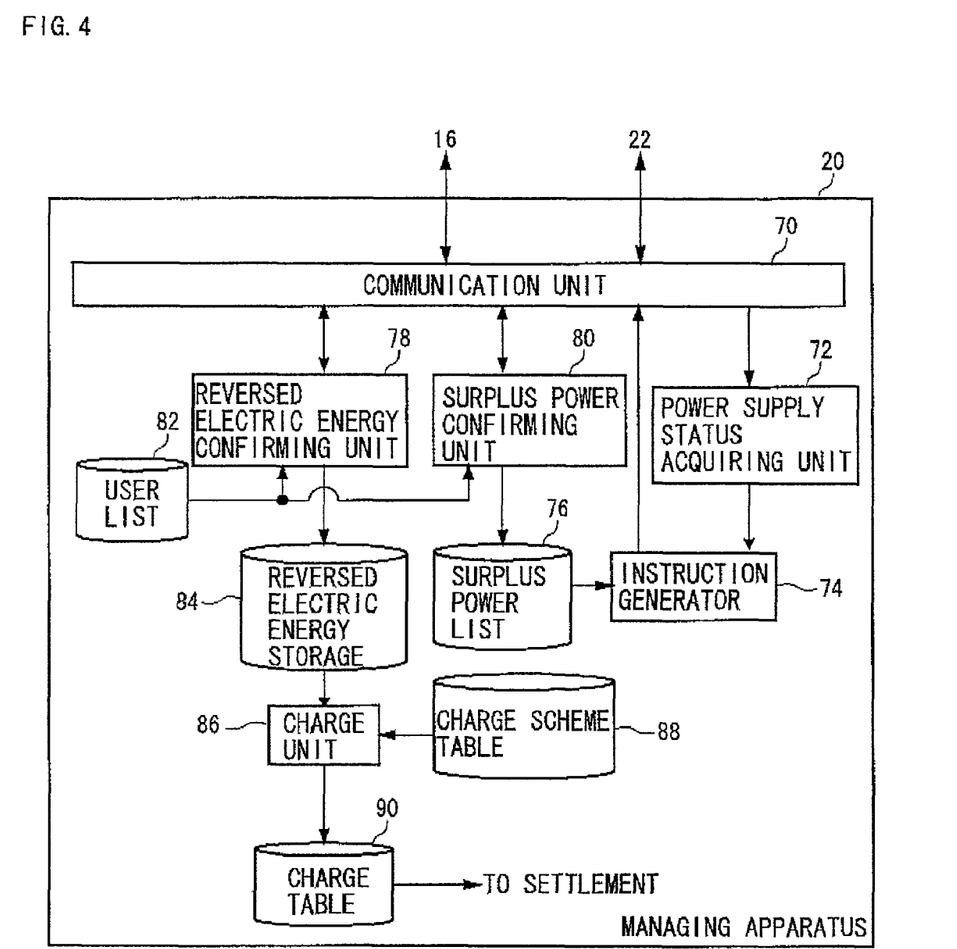
FIG. 4 shows a structure of a managing apparatus in a managing company.

FIG. 4 shows an example of the structure of the managing apparatus 20. This structure, too, is realized by a combination of a microcomputer and other hardware and software. A communication unit 70 communicates with each distributed power generation system 12 over the Internet 16 and communicates directly with the power company 22. Remote instructions to be issued to the distributed power generation systems 12 are given by the use of, for instance, a connection-type transport layer protocol such as TCP/IP (Transmission Control Protocol/Internet Protocol).

A power supply status acquiring unit 72 acquires information on the current status of power supply, especially on whether or not it is pressed and tight for power supply, from the power company 22 and conveys this status to an instruction generator 74. When the power supply is tight and restricted, the instruction generator 74 sends out the remote instructions to the distributed power generation systems 12 by referring to a surplus power list 76 (described later) and asks for the reversing of surplus power therefrom.

In preparation for the imminent shortage of power supply, a surplus power confirming unit 80 checks, as appropriate, all the users recorded in a user list 82 to confirm the surplus power that can be supplied from their distributed power generation systems 12. The confirmation is made, for instance, by using any of the following methods:

1. An estimated value of the surplus power that can be supplied from the available distributed power generation systems 12 is detected based on the past records of reversings.
2. The surplus power that can be supplied is estimated based on reports and assessment made by the users themselves.

3. The surplus power confirming unit 80 as a Web server invites users in public to supply their surplus power, and some benefit will be given to the enlisted users.

In any case, the confirmed surplus power of each distributed power generation system 12 is recorded in the surplus power list 76, and the instruction generator 74 selects, as needed, suitable distributed power generation systems 12 to which the remote instructions are to be sent.

A reversed electric energy confirming unit 78, by referring to the user list 82, receives data on the electric energy measured by the second power meter 52 shown in FIG. 2, namely, the total reversed electric energy, from all the participating distributed power generation systems 12 and records the data thereof in a reversed electric energy storage 84. A charge unit 86, by referring to the reversed electric energy storage 84, decides the charges to be levied to the users and the power company 22 according to the reversed electric energy. When making this decision, reference is made to a charge scheme table 88 that sets charging rules. The charges thus determined are recorded in a charge table 90, and the accounts are settled electronically or otherwise (not shown).

Figure 5:
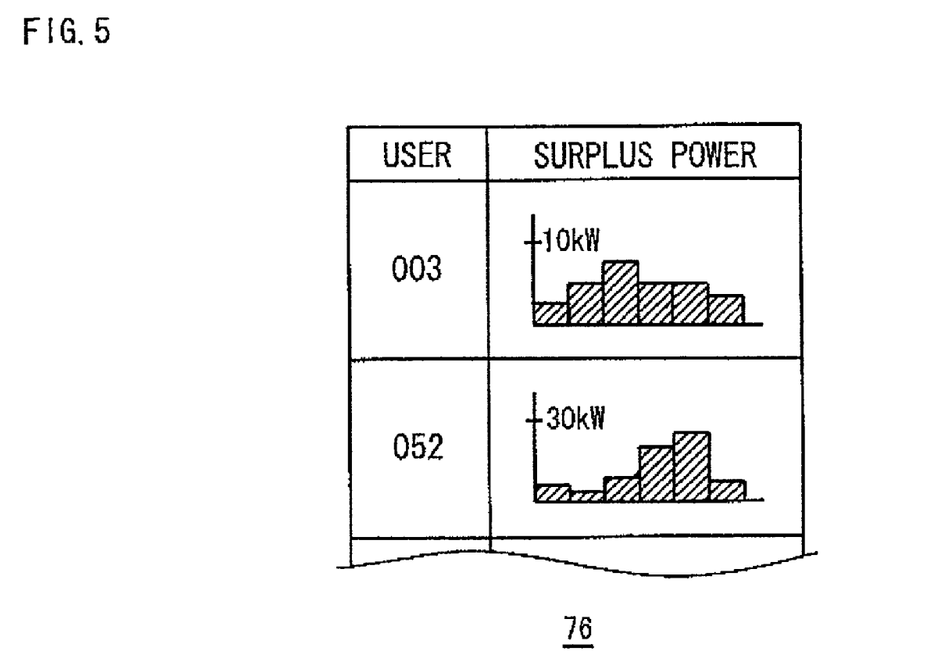
FIG. 5 shows an internal structure of a surplus power list in the managing apparatus.

FIG. 5 shows schematically an internal structure of a surplus power list 76. The surplus power list 76 lists the surplus power that can be supplied from each user in graphs whose horizontal axis represents the time. For example, a user "003" can offer a maximum of approximately 7 kilowatts (kW or kWh) and a minimum of approximately 2 kW of electric power. Thus, if the generation capacity of the distributed power generation system 12 of this user is set by the remote instructions at a maximum at the time when the "7 kW" of electric energy can be supplied, then the 7 kW of power can be reversed as surplus power to the power system 14.

In a similar manner, a user "052" can offer a maximum of approximately 25 kW and a minimum of approximately 3 kW of electric power. The extent of electric power that can be supplied is determined by the rating of the fuel cell system 30 used and the power demand of the user. The time on the horizontal axis may be the time in a month or the hours of day as long as it can be used as an indicator of how much reversed power is available from which users When the power company 22 is greatly pressed for power to supply to its customers, the instruction generator 74 may maximize the generation capacity of all the distributed power generation systems 12. Or when the power shortage is less serious, it may, for example, select the distributed power generation systems 12 with relatively large surplus power, such as the one belonging to the user "052", and maximize their generation capacity, or otherwise select a large number of distributed power generation systems 12 with relatively small surplus power and maximize their generation capacity. The larger the population of the participating distributed power generation systems 12 is, the greater the freedom of such selection will be.

Figure 6:
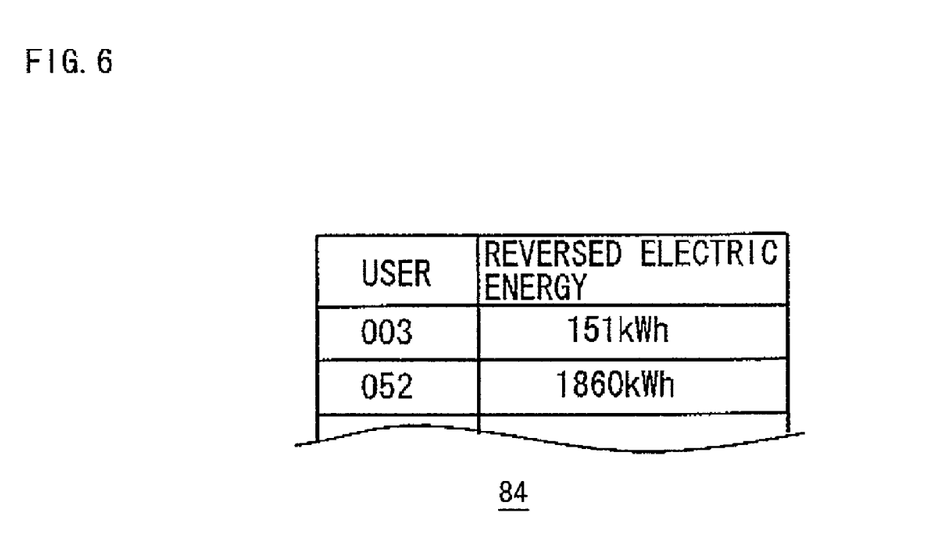
FIG. 6 shows an internal structure of a reversed electric energy storage in the managing apparatus.

FIG. 6 shows an internal structure of the reversed electric energy storage 84. The reversed electric energy storage 84 stores the reversed electric energy of each user. For example, the total accumulated reversed electric energy from the user "003" is "151 kWh" while that from the user "052" is "1860 kWh".

Figure 7:
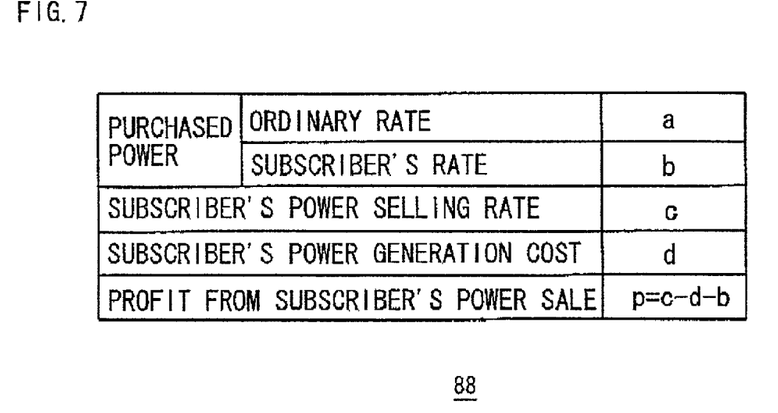
FIG. 7 shows an internal structure of a charge scheme table in the managing apparatus.

FIG. 7 shows an internal structure of a charge scheme table 88. Electricity rates when the users purchase power are divided into "ordinary rates" and "subscriber rates." Whereas the former is the ordinary electricity rates, the latter is the special rates with discounts for the users of distributed power generation systems 12 under the contract described above. Here, there is a relationship of a>b between the former, or "a", and the latter, or "b". Hereinbelow, the user who is a subscriber will be referred to simply as a "user" or a "subscriber".

On the other hand, a power selling rate that is paid to a subscriber for the reversing of power from his/her distributed power generation system 12 to the power system 14 is set as "c", and the generating cost at the distributed power generation system 12 is denoted by "d" as an empirical or actual value. Thus, a profit p of the subscriber from selling power per unit electric energy is:

$$p=c-d-b$$

Figure 8:
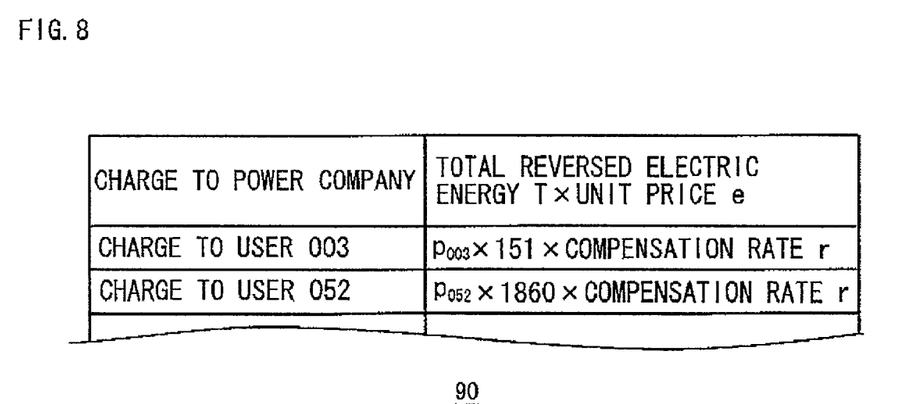
FIG. 8 shows an internal structure of a charge table in the managing apparatus.

FIG. 8 shows an internal structure of the charge table 90. Written in the table are a charge to the power company 22 and a charge to each of the users. The charge to the power company 22 is calculated by multiplying the total reversed electric energy T supplied by all the users by a unit price e specified by the contract. The charge to each user is calculated by multiplying a profit p of the user from power sale by a compensation rate r specified by the contract. For example, if the profit of the user "003" from power sale is $P_{003}$ per unit electric energy, then the total profit of this user from power sale will be $P_{003} \times 151$ and the charge to the user, as a kind of contingent fee or brokerage commission, will be:

$$P_{003} \times 151 \times r$$

In actual operation, the charge by the managing company 19 to each user may be in a fixed rate or in such a method that part of the power selling rate c to be paid by the power company 22 to the user (hereinafter referred to as a "share amount") may be received in advance from the power company 22. In such a method, the users need not pay the commission or handling charge directly to the managing company 18. Thus this method is advantageous as a business model for the managing company 18.

Another point of consideration is a maintenance cost for the distributed power generation system 12 that has reversed its surplus power in response to the remote instructions. Filters and other consumable parts are used in the fuel cell system 30. Therefore, the managing company 18 may collect slightly increased share amount and use part of this amount as reserve or insurance money for maintenance service. In that case, the user will be exempted from paying the cost of repair or part replacement when the user's distributed power generation system needs it. In other words, the user can gain not only profits from power sale but also the warranty of maintenance by simply joining this business plan.

Figure 9:
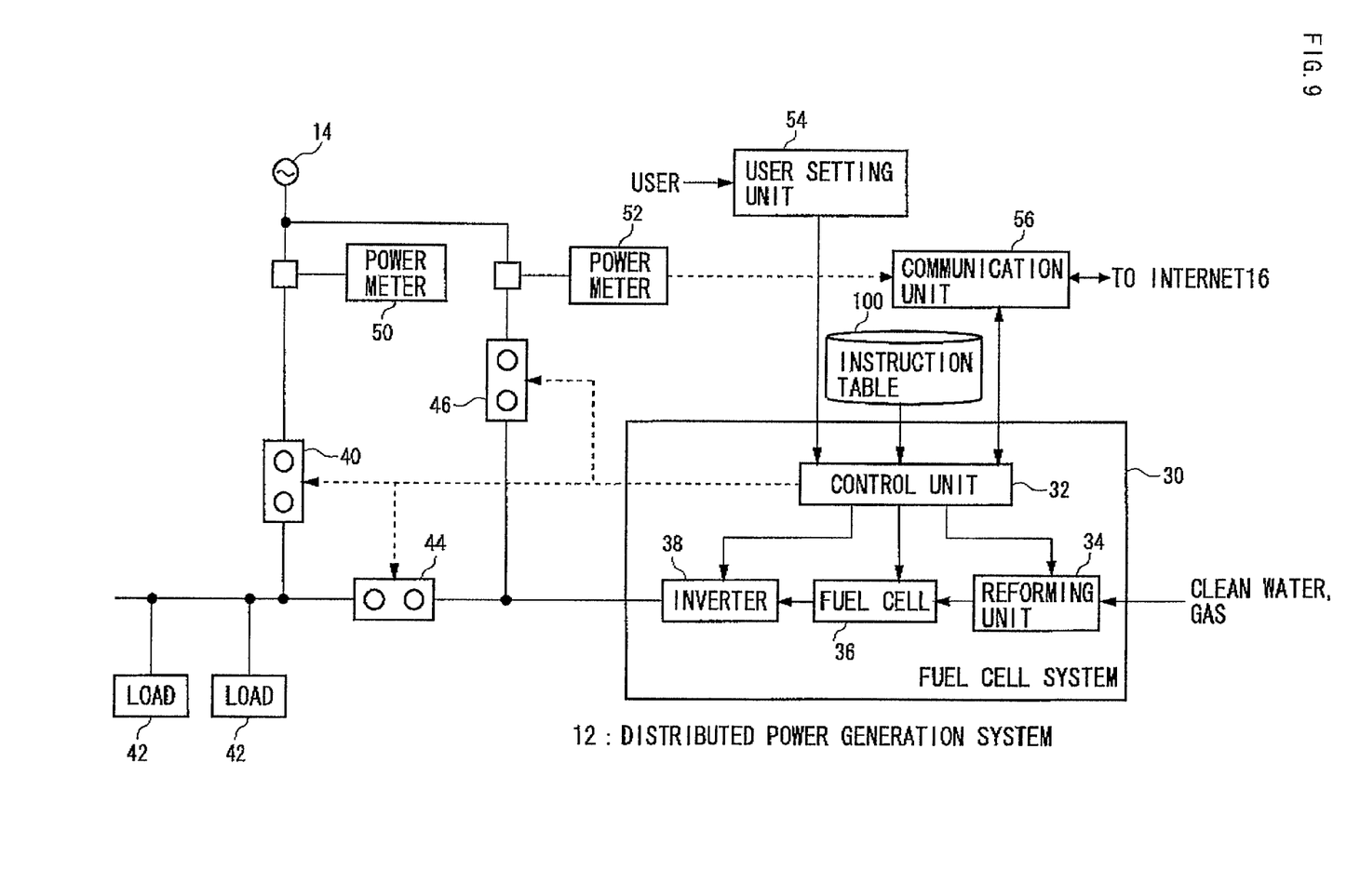
FIG. 9 shows another structure of a distributed power generation system according to a preferred embodiment.

FIG. 9 shows another structure of the distributed power generation system 12. Hereinbelow, the same reference numerals will be used for the same constituent units as in FIG. 2, and only points differing therefrom will be described here. Whereas the distributed power generation system 12 shown in FIG. 2 receives the remote instructions, the distributed power generation system 12 shown in FIG. 9 has an instruction table 100 which predicts remote instructions beforehand and stores them.

Figure 10:
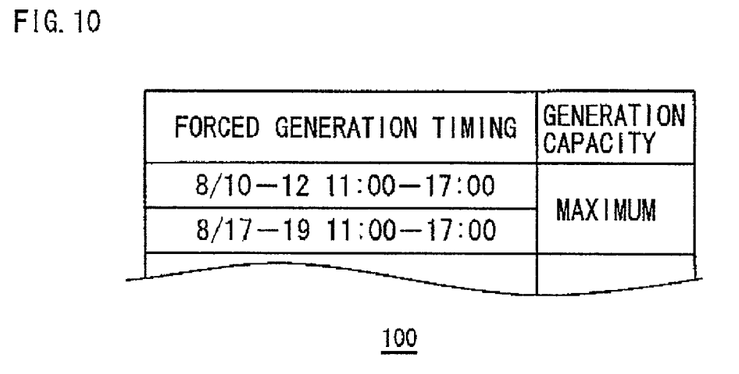
FIG. 10 shows an internal structure of an instruction table in the distributed power generation system shown in FIG. 9.

FIG. 10 shows an internal structure of the instruction table 100. In this table, the timing in every year for the peak power consumption is written as the 11:00 through 17:00 on the 10th through 12th of August, which is a period to be treated as a forced generation timing. In other words, at this timing, the power generation capacity is always set to a maximum and the reversing of surplus power is carried out irrespective of user settings. According to this structure, the total amount of communication is reduced because there is no need for transmission and reception of the remote instructions. Moreover, it will present greater safety because no communication occurs and is necessitated during the peak of power consumption.

So far there have been described the basic relationship between and the functions of the distributed power generation systems 12, the managing company 18 and the power company 22. Examples of system configurations which are considered meaningful in practical application will be described next.

Figure 11:
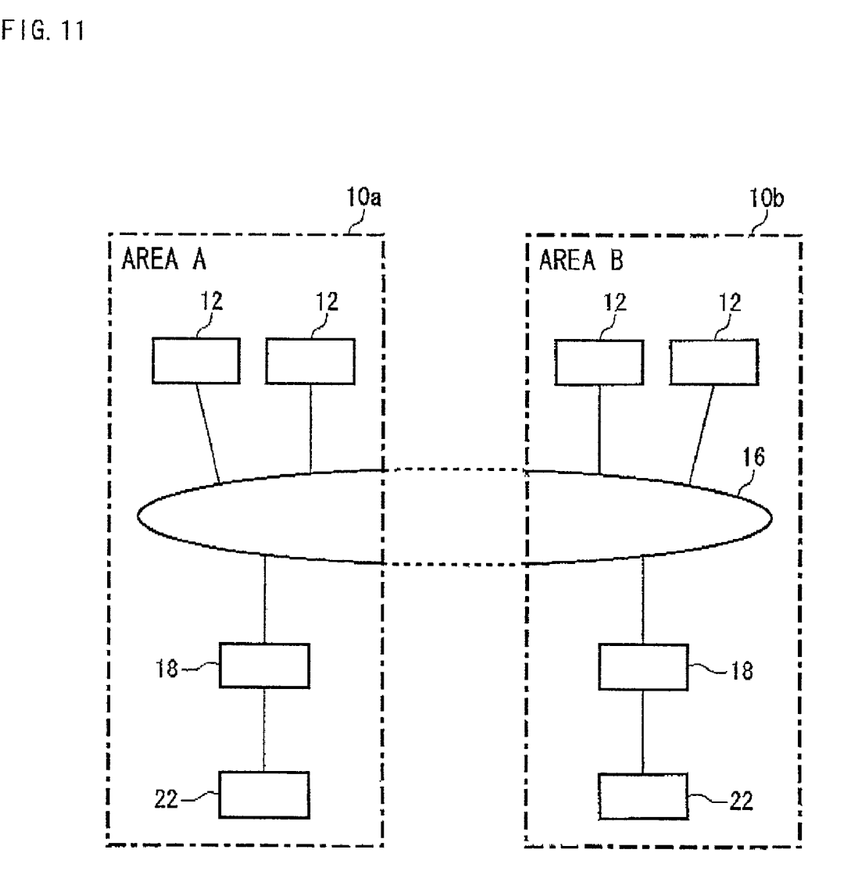
FIG. 11 is a general view showing another structure of a power supply system.

FIG. 11 shows a structure which is realized by introducing a concept of "area" to the present business model. In this structure, a power supply system 10a in area A exists in parallel with a power supply system 10b in area B, and each of them includes a plurality of distributed power generation systems 12, a single managing company 18 and a single power company 22 as in FIG. 1. According to this structure, the response to the peak of power demand can be divided into smaller areas, so that the risk of power shortage to the whole area at the peak time will be reduced.

Figure 12:
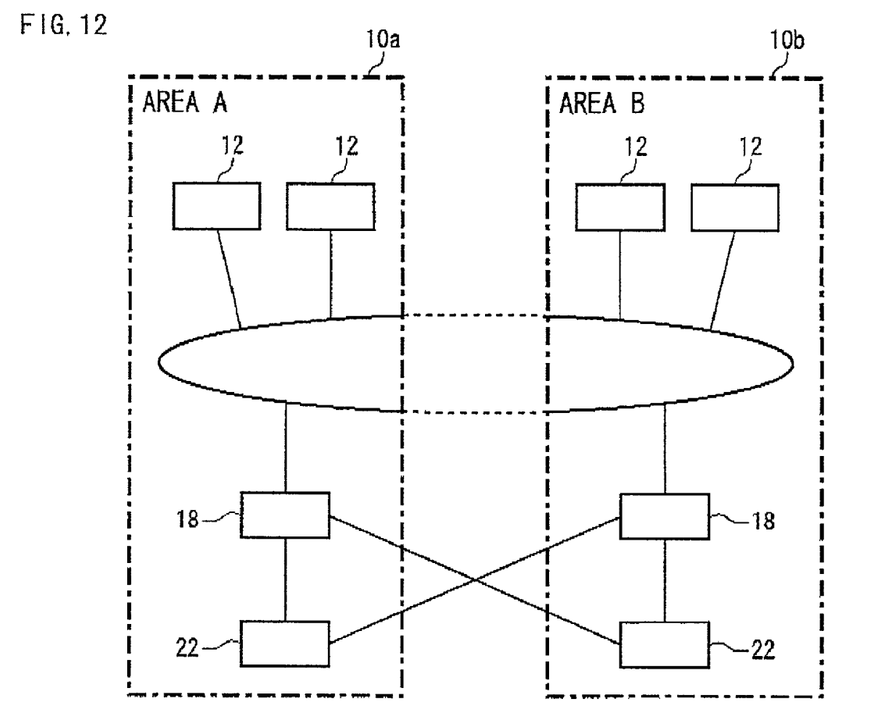
FIG. 12 is a general view showing still another structure of a power supply system.

Similarly, FIG. 12 shows another structure incorporating the concept of areas. While the general structure is the same as the one shown in FIG. 11, the power companies 22 in this case are each linked to the managing company 18 in the other area as well. According to this configuration, when there occurs a power shortage in area A, the power company 22 in the area A can issue a request for a power reversing simultaneously to the managing companies 18 in both areas. If the surplus power from within area A suffices to solve the shortage, the request for reversing to the other area will be retracted, or if it does not suffice, surplus power obtained in the other area will be transmitted to areas (in this case, area A) with the shortage.

In this method, the request by a power company is somehow used for smoothing and averaging the power supply among different areas. Instead of a power company 22 communicating with a plurality of managing companies 18, however, a plurality of the managing companies 18 may communicate with one another. In that case, the power company 22 is only required to contact the managing company 18 within its own area, and the transmission of power between different areas is done by the linkage and cooperation of the managing companies 18 themselves.

Figure 13:
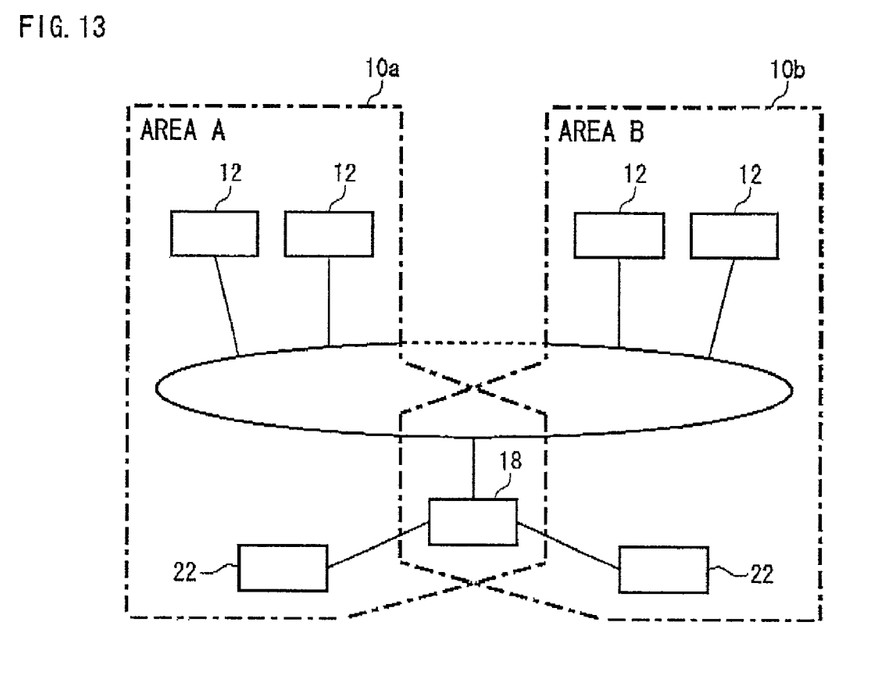
FIG. 13 is a general view showing still another structure of a power supply system.

FIG. 13 shows still another structure incorporating the concept of areas. In this configuration, a single managing company 18 manages and controls two areas A and B, so that the distributed power generation systems 12 and power companies 22 in both areas are connected to the single managing company 18. In this case, the averaging and smoothing of power supply between the two areas are accomplished smoothly and speedily. For example, it is possible that the whole land of Japan is divided into some areas and a managing company 18 enters into contracts individually with power companies 22 in different areas and supplies electric power in response to requests made by individual power companies 22 using the distributed power generation systems 12 in respective areas.

In any of the cases as illustrated in FIGS. 11 through 13, however, it is desirable that the power shortage in one area be solved primarily by the surplus power from the distributed power generation systems 12 within the same area and only secondarily, when the power shortage can not be fully covered, by the surplus power from the distributed power generation systems 12 in other areas.

The present invention has been described based on preferred embodiments. It should be understood by those skilled in the art that these embodiments are only exemplary and various modifications to each component, process and combination thereof are possible and that those modifications are effective as embodiments and are encompassed by the scope of the present invention.

Although a user setting unit 54 is provided in the distributed power generation system 12 according to the present embodiments, the structure for a user to set the generation capacity is not essential. For example, the generation capacity may be fixed, and the setting may be made automatically with a certain constant margin added in accordance with actual loads, thus various other setting methods may be implemented.

Moreover, the managing company 18 and the power company 22 may be realized substantially by a same party, so that a series of necessary processings may be carried out in an integrated manner. In that case, the system may be operated by structuring a Web server and other hosts within the power company 22.

The managing company 18 and the power company 22 may be interconnected not necessarily by a dedicated line but over the Internet 16. Its design, however, depends on the degree of security required for communications between the managing company 18 and the power company 22.

According to the above preferred embodiments, the electricity rate for the user is set at b, which is lower than a regular rate. The reversing of electric power, however, can be carried out as a preventive measure in addition to when supply of power is tight and restricted in the power system 14. In that case, the rates may be divided into a "power sale rate at power shortage", which is "c" (see FIG. 7) in the above embodiment, and a "power sale rate at normal times" where the "power sale rate at power shortage" is set markedly higher than the "power sale rate at normal times".

The distributed power generation systems 12, which uses the fuel cell system 30 for power generation, may of course use other generation means. For example, since a solar cell system gains high generation capacity in the daytime of midsummer when the power demand normally peaks, this can be utilized. It is also possible that the scattering of the distributed power generation systems 12 in a wide area reduces the effect of the weather. Moreover, it goes without saying that various types of generating means may be provided in a mixed manner as the distributed power generation systems 12.

The area covered by the power supply system 10 is not limited to Japan or any other country. The averaging and smoothing of power supply may be realized across the borders of countries. The areas to be selected and other modes of operation to be implemented will be determined by a balance between the transmission cost and other problems and advantageous aspects of the power supply system 10.

According to the present embodiments, a power supply system of high practical value and usability is realized.

Although the present invention has been described by way of exemplary embodiments, it should be understood that many changes and substitutions may be made by those skilled in the art without departing from the scope of the present invention which is defined by the appended claims.

What is claimed is:

1. A distributed power generation system having a generator, the system comprising:
   a communication unit which communicates with a network;
   a control unit which controls generation capacity of the generator in accordance with an instruction issued via the network;

a first switch which connects between a load coupled to the generator and a power system outside the distributed power generation system;

a second switch which connects between the load and the distributed power generation system, the opening and closing of the first switch being opposite to that of the second switch; and a third switch which connects between the distributed power generation system and the power system outside the distributed power generation system, and which is closed only when the first switch is open, wherein the distributed power generation system supplies power to the load while also reversing power to the power system outside the distributed power generation system via the third switch.

2. A distributed power generation system having a generator, the system comprising:

an instruction table which describes an instruction as to generation capacity of the generator in a time-dependent manner;

a control unit which controls the generation capacity in accordance with description of said instruction table;

a first switch which connects between a load coupled to the generator and a power system outside the distributed power generation system;

a second switch which connects between the load and the distributed power generation system, the opening and closing of the first switch being opposite to that of the second switch; and a third switch which connects between the distributed power generation system and the power system outside the distributed power generation system, and which is closed only when the first switch is open, wherein the distributed power generation system supplies power to the load while also reversing power to the power system outside the distributed power generation system via the third switch.

3. A distributed power generation system having a generator, the system comprising:

a control unit which controls generation capacity of the generator;

a first switch which connects between a load coupled to the generator and a power system outside the distributed power generation system;

a second switch which connects between the load and the distributed power generation system, the opening and closing of the first switch being opposite to that of the second switch; and a third switch which connects between the distributed power generation system and the power system outside the distributed power generation system, and which is closed only when the first switch is open, said control unit including:

a first setting unit which receives from a user of the distributed power generation system a setting of the generation capacity; and a second setting unit which receives a setting of the generation capacity via a network, wherein processing of a setting content in said second setting unit is given higher priority compared to that of a setting content in said first setting unit and wherein the distributed power generation system supplies power to the load while also reversing power to the power system outside the distributed power generation system via the third switch.

4. The distributed power generation system according to claim 1, wherein said control unit further controls opening and closing of a path to reverse-feed power generated by the generator to a power system.

5. The distributed power generation system according to claim 2, wherein said control unit further controls opening and closing of a path to reverse-feed power generated by the generator to a power system.

6. The distributed power generation system according to claim 3, wherein said control unit further controls opening and closing of a path to reverse-feed power generated by the generator to a power system.

7. The distributed power generation system according to claim 1, wherein the generator includes a fuel cell.

8. The distributed power generation system according to claim 2, wherein the generator includes a fuel cell.

9. The distributed power generation system according to claim 3, wherein the generator includes a fuel cell.

* * * * *

UNITED STATES PATENT AND TRADEMARK OFFICE
CERTIFICATE OF CORRECTION

PATENT NO. : 7,105,946 B2 Page 1 of 1
APPLICATION NO. : 10/109485
DATED : September 12, 2006
INVENTOR(S) : Y. Akiyama et al.

It is certified that error appears in the above-identified patent and that said Letters Patent is hereby corrected as shown below:

| COLUMN | LINE | |
|---|---|---|
| (56) Pg. 1, col. 2 | Refs. Cited (U.S. Patents, Item 5) | "6,850,820   B1" should read --6,850,820   B2-- |
| (74) Pg. 1, col. 2 | Attorney, Agent or Firm | "O'Conner" should read --O'Connor--. |

Signed and Sealed this

Thirteenth Day of February, 2007

JON W. DUDAS
*Director of the United States Patent and Trademark Office*